(12) United States Patent
Forrest

(10) Patent No.: US 10,421,892 B2
(45) Date of Patent: Sep. 24, 2019

(54) DRILLING FLUIDS AND METHODS FOR MAKING THE SAME

(71) Applicant: Clean Slurry Technology, Inc., Bakersfield, CA (US)

(72) Inventor: John Charles Forrest, Louisburg, KS (US)

(73) Assignee: Clean Slurry Technology, Inc., Bakersfield, CA (US)

( * ) Notice: Subject to any disclaimer, the term of this patent is extended or adjusted under 35 U.S.C. 154(b) by 0 days.

(21) Appl. No.: 16/134,747

(22) Filed: Sep. 18, 2018

(65) Prior Publication Data

US 2019/0127626 A1     May 2, 2019

Related U.S. Application Data

(60) Provisional application No. 62/578,562, filed on Oct. 30, 2017, provisional application No. 62/642,256, filed on Mar. 13, 2018.

(51) Int. Cl.
*C09K 8/34* (2006.01)
*E21B 21/06* (2006.01)

(52) U.S. Cl.
CPC .............. *C09K 8/34* (2013.01); *E21B 21/062* (2013.01)

(58) Field of Classification Search
None
See application file for complete search history.

(56) References Cited

U.S. PATENT DOCUMENTS

2015/0315454 A1* 11/2015 Perez-Cordova ...... C09K 8/265
507/103

OTHER PUBLICATIONS

"Muddrill Pro+ High Performance Drilling Fluid", Rolfson Oil, undated, 1 page.
"Safety Data Sheet: MudDrill Pro Plus", Rolfson Oil, Jul. 17, 2017, 11 pages.

* cited by examiner

*Primary Examiner* — Jeffrey D Washville

(57) ABSTRACT

A mixture suitable for use in a drilling fluid includes an amount base fluid and recycled fuel oil in an amount sufficient to provide an emulsion stability of the drilling fluid of about 500 volts or greater.

12 Claims, No Drawings

DRILLING FLUIDS AND METHODS FOR MAKING THE SAME

CROSS-REFERENCE TO RELATED APPLICATIONS

The present application claims the benefit of U.S. Provisional Patent Applications Nos. 62/578,562, filed Oct. 30, 2017, and 62/642,256, filed Mar. 13, 2018, both of which are incorporated herein in their entirety for all purposes.

FIELD OF INVENTION

The present invention relates in general to petroleum drilling techniques and in particular to drilling fluids and methods for making the same.

BACKGROUND OF INVENTION

Drilling fluid ("drilling mud") is a fluid used during the process of drilling boreholes into the subsurface strata for hydrocarbon extraction. Generally, the drilling fluid lubricates and cools the drill bit during drilling operations, seals off the wall of the bore, effectively isolating the bore from the formations, lifts the drilling cuttings from the bit to surface, and provides the primary defense for well control. Drilling fluids are typically classified into three categories: (1) water-based; (2) non-water based; and (3) pneumatic. The discussion below is based on non-water based fluid systems.

Generally, the drilling fluid and required additives are supplied to the drilling rigs by various vendors and depending on the type of equipment used, and the types of formations to be encountered, the formula and properties of the drilling fluid chosen will vary.

Typically, when recycling oil-based mud, it becomes necessary to build the volume of the system in order to dilute the weight of the drilling fluid, adjust the oil/water ratio, or simply to achieve the required volume for the drilling operation. In the standard process, diesel fuel is added into the system until the volume is such as to satisfy the oil-water ratio of the planned final total volume of drilling fluid. Following that, the emulsification additives are added in designated proportions, based on manufacturer's specification or other analytical data, and allowed to mix under the proper shear and temperature conditions to allow for a stable emulsion between the oil and water phases to be created.

At this point, other additives can be added based on the specific rheology requirements or anticipated reactions that will occur with the geologic formations being contacted. For example, lime is typically added to aid in the reaction yielding emulsification. Finally, brine, typically consisting of 25%-38% by weight of calcium chloride ($CaCl_2$), is slowly added into the slurry until the volume of brine added satisfies the desired oil/water ratio of the final design.

During the input of the brine and all other additives, the drilling fluid continues to mix under the proper shear and temperature conditions to allow for a stable emulsion to be created. The quality of the emulsion is then measured by a probe reporting a unit of measure known as the electric stability, which is a relative measure of the voltage required to break down the emulsion. An electric stability reading greater than 500 units is typically considered by industry standards to be representative of a quality stable emulsified system.

SUMMARY OF INVENTION

According to the principles of the present invention, the base fuel (e.g., diesel) is mixed with on- or off-specification used fuel oil and/or recycled fuel oil. Advantageously, the cost basis of the drilling fluid is significantly reduced. The resulting emulsion stability exceeds the industry standard of about 500 volts and most often results in an elevation to over 1,000 volts for a relaxed filtration system, which reduces or eliminates the use of additional emulsification additives.

Preferably, the diesel to fuel oil/recycled fuel oil blend ratio is from 0% to 50%. The present principles are especially applicable with regard to the recycling process, when the concentration of emulsifiers present in the stock to be recycled is unknown and larger concentrations of used/recycled fuel oil is required. (This also has the effect of reducing the volume of higher priced diesel, or other base oil, required to gain the same oil to water ratio.)

In particular, when building volume from existing drilling fluids, the addition of the oil component of the mud can be up to 100% recovered oil assuming that the base oil of the drilling fluid initially was strictly diesel fuel and the electric stability of the emulsion is significantly low. This number can vary based on the tests prior to treatment but preferably does not dip below 50% of the added volume from the oil component.

The same methodology, process and formula are applied to the production of virgin oil-based drilling fluid to obtain the same results of a better product at a less expensive cost than the traditional methods. Furthermore, by mixing diesel fuel directly with the on- or off-specification used/recycled fuel oil, a standalone diesel oil product is created that may be used as an additive to an existing oil-based drilling fluid system or as a direct base oil for the creation of the virgin oil-based drilling fluid, with the same results of a better product that is less expensive.

Primary cost savings are attributable to the ability to reduce the volume of diesel fuel or other base oil required by as much as 100% and to the reduction in additional emulsification systems by as much as 100% over traditional systems.

While the principles of the present invention are particularly suitable to inverted oil based relaxed filtrate drilling fluid systems, which use diesel fuel as the base oil, they may be also be suitably applied to other systems, with other bases such as mineral oil, kerosene, and other base oils, as well as to conventional (tight emulsion) systems.

DETAILED DESCRIPTION OF THE INVENTION

According to the principles of the present invention, diesel fuel is mixed with on- or off-specification used and/or recycled (recovered) fuel oil, for example recycled fuel oil, to create a drilling fluid emulsion with a stability that exceeds the industry standard of about 500 volts and most often results in an elevation to over 1,000 volts for the relaxed filtration system. (The electric stability metric is a measure of the required voltage needed to break the polarized bond created between the oil and water phases. The oil base fluid is a non-conductive material by nature. During an electric stability test, by creating a conductive bridge between electrodes and then measuring the voltage needed to break the polarized bond created between the oil and water phases, as described, for example, in American Petroleum Institute Recommended Practice [API RP] 13-B Section 11.) In other words, the use of the recycled oil allows for as high, or higher electric stabilities than can be achieved using industry emulsifiers at much lower cost point.

A preferred process for creating new virgin drilling fluid is as follows. A brine of water and 25%-38% by weight calcium chloride ($CaCl_2$) is created and kept separate. Diesel fuel base oil and on- or off-specification recycled fuel oil are blended to the desired ratio. Adequate shear and temperature conditions are present in the mixing system.

The diesel base oil to recovered fuel oil ratio will vary depending on the application. It has been discovered that for the creation of new drilling fluids, a mixture consisting of 1-part diesel to 1-part recovered oil (on-specification recycled fuel oil) is the most advantageous and provides the most consistent results. On the other hand, when building volume from existing drilling fluids, the addition of the oil component of the mud can be up to 100% recovered oil, assuming that the base oil of the drilling fluid was initially strictly diesel fuel and the electric stability of the emulsion is significantly low. This number can vary based on the tests prior to treatment, but will very likely not dip below 50% of the added volume from the oil component.

While not being bound to any particular theory as to cause, the use of a blend of diesel and recovered fuel oil do realize several benefits. First, the recovered fuel oil provides an avenue to limit the use of standard emulsifiers in an all diesel system. This is due to the fact that fuel oils, such as motor oil, have detergent additives blended into them to allow for the absorption of water molecules within the engine/gear box compartments. These detergents are designed to have both highly polar and non-polar ends allowing for the binding of the oil and water components into a stable emulsion. Second, the addition of the recycled fuel oil increases the C16+ hydrocarbon chains present in the fluid, which aids in friction reduction, increases the aniline point, increases the flash point, and increases the lifespan of rubber and Teflon seals present in the drilling system.

Lime is added to blended diesel fuel/fuel oil blend in the desired concentration, typically, between 2.5 and 6 pounds per barrel. Rheology agents, weighting agents, and other chemicals are added, as necessary to fit drilling requirements of the operator. The $CaCl_2$ brine is blended in to meet required oil/water ratio. As known in the art, the oil/water ratio is determined by the needs of the drilling operator, as tested in accordance with API RP 13-B Section 9. Generally, the oil-to-water ratio is tested via laboratory retort analysis, with common standard volumes of fluid sampled for analysis being 10 mL, 20 mL, and 50 mL, with 50 mL being the most common in the testing of oil-based muds.

Mixing continues under shear and temperature until a stable emulsion is present. Generally, for typical field level applications, the necessary mechanical shear is realized through mud pumps, centrifugal pumps, shear pumps, agitators, and fluid velocity systems (i.e., venturi adductors), as well as the pressure and heat present under bottom hole conditions as the fluid exits the bit jets while circulating the wellbore. In the laboratory, mechanical shear is typically achieved by means of high speed specialty blenders. The shearing properties and profile of the slurry are measured via viscometer, and are a function of clays, polymers, and other additives moving the base fluids from being Newtonian to a Non-Newtonian shear thinning fluid, which is most desirable for drilling operations. API RP 13-B Section 7 describes procedures for measuring shear.

Tests are then performed on the resulting recycled drilling fluid in accordance with API RP 13b and compare results to desired drilling fluid properties. Any modifications are made as necessary.

A process for recycling drilling fluid according to the present principles is as follows. Tests are performed on the drilling fluid to be recycled in accordance with API Recommended Practice 13b to characterize the existing chemistry, constituent concentrations, and the condition of the drilling fluid. Any adjustments needed to bring the drilling fluid into an acceptable condition for use in the drilling process are then made.

In particular, evaluations are made to determine: (1) the volume of low gravity solids to be removed; (2) the brine density and concentrations of calcium chloride ($CaCl_2$) and other salts, such as sodium chloride (NaCl), which may be present; (3) any excess lime concentration and required additions or dilutions; (4) the percent solids, oil, and water; (5) the oil/water ratio; (6) the rheological properties; (7) the volume and concentration of calcium chloride ($CaCl_2$) brine to be added and built separately, or the volume of powdered calcium chloride ($CaCl_2$) to be blended into the existing water phase to achieve the desired concentration (if the existing water phase salinity is too high, pure water may be added for dilution to the required concentration, as well); and (8) the volume and concentration of diesel fuel to on- or off-specification used/recycled fuel oil to be added.

The drilling fluid is then processed, as necessary, through solids control equipment. The brine is separately built. The mixing of the recycled fluid under starts under appropriate shear and temperature conditions, with the total volume of diesel fuel and on- or off-specification used/recycled fuel oil blended in slowly and allow to circulate.

Lime is blended in, as necessary. Rheology agents, weighting agents, and other chemicals as necessary to fit drilling requirements, are also blended in. The calcium chloride ($CaCl_2$) brine, calcium chloride ($CaCl_2$) powder, and/or pure water are slowly blended in, as needed to meet the required oil/water ratio. Mixing continues under shear and temperature until a stable emulsion is present.

Tests are performed on the resulting recycled drilling fluid in accordance with API Recommended Practice 13b and the results compared to the desired drilling fluid properties. Any modifications are made, as necessary.

In sum, the building of new virgin drilling fluid and the building of recycled drilling fluid, generally follow the same process, with the exception of there being no recycled product present at the start during the building of virgin drilling fluid. Therefore, the volumes of base oil, additives, and brine are subject only to the desired final volume to be created with no existing conditions to be corrected or modified.

The principles of the present invention are also embodied in a process for creating an additive or base oil for oil-based drilling fluid. The essential steps of a preferred process are as follows.

The mixture concentrations of diesel, or other base oil, and diesel fuel to on- or off-specification used/recycled fuel oil are determined. The appropriate volumes of the diesel fuel, or other base oil, and on- or off-specification used/recycled fuel oil are the added to a tank, pit, or other apparatus capable of safely holding the two liquids. (Note that it does not matter the order in which the liquids are added, or if they are added simultaneously, but only that the volumes of each are representative of the design.)

The liquids are mixed using pumps, by agitation, or by any other means that will result in as near a homogenous mixture as possible of the two liquids. For application as a base oil, the created oil mixture would be inserted as a direct replacement for the adjustment steps in the process set forth immediately above. To create new virgin drilling fluid, this mixture directly replaces the step of blending the diesel fuel and on- or off-specification used/recycled fuel oil blended in the process to recycle drilling fluid. For application as an additive to an oil-based mud system, the diesel oil is added directly into the system at any point deemed necessary during the drilling of a well, or any other time, to increase the emulsion stability, modify the oil to water ratio, or improve other qualities of the drilling system.

In each of the products set forth above (i.e., virgin drilling fluid, recycled drilling fluid, and additives), the concentrations the on- or off-specification used/recycled fuel oil in the oil mixture, as referenced to the diesel fuel oil component, can range from 1 to 100%, depending on the desired final application.

In sum, embodiments of the principles of the present invention realize significant advantages over the prior art. Among other things, these embodiments reduce environmental impact by recycling/repurposing on-specification fuel oil. In addition, embodiments of the present invention eliminate the need for emulsifiers during the creation of new mud. Furthermore, the use of recycled fuel oil reduces friction in the wellbore, adds to the longevity of fluid system components (e.g., the pumps, seals, and so on), and significantly reduces the cost structure over traditional methods.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A mixture suitable for use in a drilling fluid comprising:
   an amount of diesel base fluid; and
   recycled fuel oil in an amount sufficient to provide an emulsion stability of a drilling fluid of about 500 volts or greater, the recycled fuel oil comprising recycled motor oil.

2. The mixture of claim 1, wherein the mixture comprises up to about 50% recycled fuel oil.

3. The mixture of claim 1, wherein the mixture of the base fluid and the recycled fuel oil form a portion of a virgin drilling fluid.

4. The mixture of claim 1, wherein the mixture of the base fluid and the recycled fuel oil form a portion of a drilling fluid including recovered drilling fluid.

5. The mixture of claim 3, wherein the virgin drilling fluid comprises a relaxed filtrate drilling fluid.

6. A drilling fluid comprising an amount of diesel base fluid and recycled fuel oil in an amount sufficient to provide an emulsion stability of about 500 volts or greater, the recycled fuel oil comprising recycled motor oil.

7. The drilling fluid of claim 6, wherein a ratio between the amount of diesel base fluid and the amount of recycled fuel oil is up to about 1:1.

8. The drilling fluid of claim 6, wherein the drilling fluid comprises virgin drilling fluid.

9. The drilling fluid of claim 6, wherein a portion of the drilling fluid comprises recycled drilling fluid.

10. A method of forming a drilling fluid comprising:
    mixing a selected amount of diesel base fluid with a selected amount of recycled fuel oil to form a mixture, the recycled fuel oil comprising recycled motor oil; and
    mixing the mixture with other components to form a drilling fluid, the amount of recycled fuel oil selected to provide an emulsion stability of the drilling fluid of about 500 volts or greater.

11. The method of claim 10, wherein mixing the mixture with other components to form a drilling fluid comprises mixing the mixture with other components to form a virgin drilling fluid.

12. The method of claim 10, wherein mixing the mixture with other components to form a drilling fluid comprises mixing the mixture with recovered drilling fluid.

* * * * *